Aug. 15, 1972     G. E. SMEDBERG     3,684,600
HOT MELT CARPET BACKSIZING PROCESS
Filed April 10, 1970
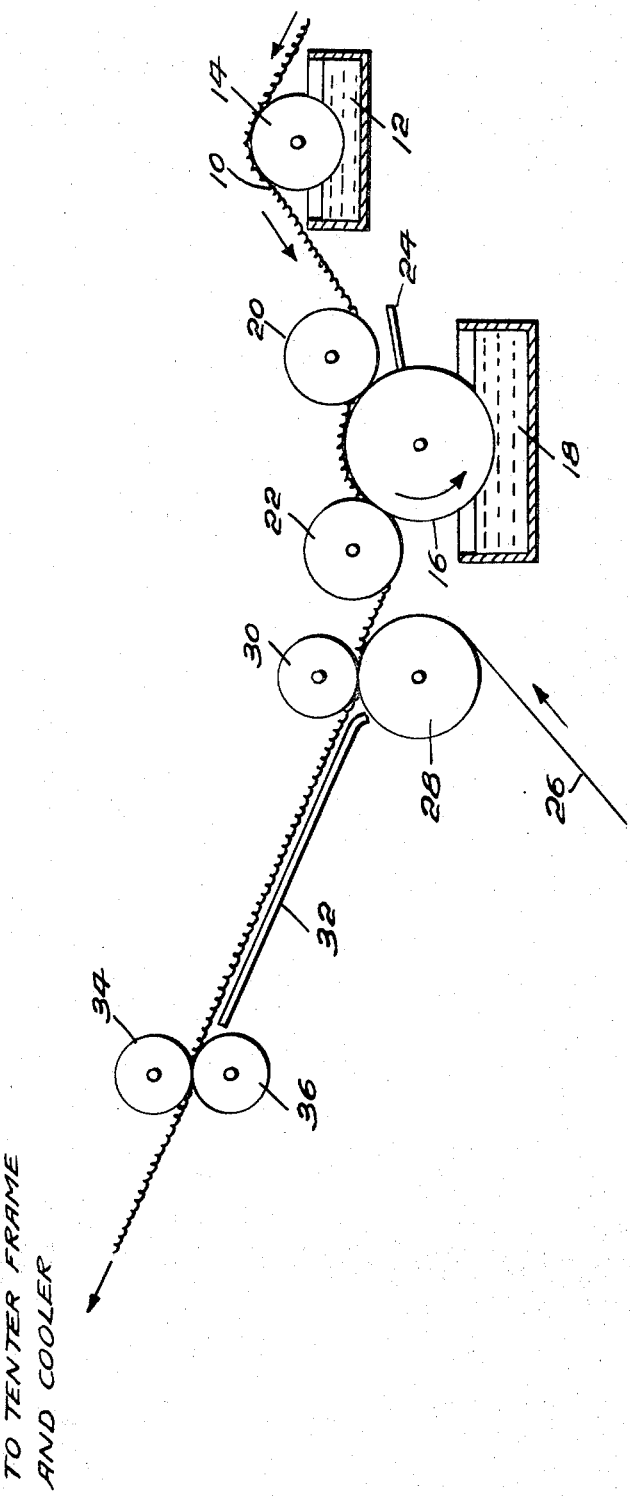

United States Patent Office 3,684,600
Patented Aug. 15, 1972

3,684,600
HOT MELT CARPET BACKSIZING PROCESS
George Elmer Smedberg, Wilmington, Del., assignor to E. I. du Pont de Nemours and Company, Wilmington, Del.
Continuation-in-part of application Ser. No. 820,229, Apr. 29, 1969. This application Apr. 10, 1970, Ser. No. 27,414
Int. Cl. B32b 7/08
U.S. Cl. 156—93                    16 Claims

ABSTRACT OF THE DISCLOSURE

In a process for preparing a carpet comprising forming a tufted structure of a primary backing material stitched with closely spaced erect loops of fiber bundles and applying to the backside of the tufted structure a hot melt adhesive backsizing composition; the improvement comprising, applying to the backside of the tufted structure, at a time prior to the application of the hot melt adhesive backsizing composition, a low viscosity (2–2000 cps.) precoat adhesive which serves to penetrate the fiber bundles and bond the individual fiber filaments to the primary backing material.

CROSS REFERENCE TO RELATED APPLICATIONS

This application is a continuation-in-part of copending application Ser. No. 820,229, filed Apr. 29, 1969, and now abandoned.

BACKGROUND OF THE INVENTION

For many years the production of backsized tufted carpet has been accomplished by an aqueous latex method. This method involves preparing a tufted structure by stitching a primary backing material (primary scrim) with yarn in such a manner as to form on the top surface of the material a pile composed of numerous closely spaced erect loops of fiber bundles, i.e., tufts of yarn. If desired, the loops can be cut. After forming the tufted structure, the bottom surface thereof is coated with a latex containing a polymer binder such as a styrene-butadiene copolymer and a secondary backing material (secondary scrim) is applied thereto. The structure is then passed through an oven to dry the latex. By such a process, the tufts of yarn and secondary scrim are bonded to the primary scrim. Also, the individual fiber filaments making up a fiber bundle are bonded together at the primary scrim. While such a process for preparing carpets has been satisfactory from the standpoint of performance, the necessity of a drying step is a severe disadvantage from a cost standpoint and limits production speed.

Recently, however, there has been developed a new approach to the preparation of tufted carpets. It has been found that carpet can be prepared using a hot melt adhesive backsizing composition instead of an aqueous latex. By the use of a hot melt, the necessity of oven drying the carpet is obviated. While such a hot melt method is quite appealing from the standpoint of cost, some difficulties have been encountered in preparing completely satisfactory carpet.

The hot melt method is generally accomplished by passing the bottom surface of the tufted structure over a moving applicator roll partially submerged in a reservoir containing the adhesive backsizing composition in a molten state. A doctor blade is ordinarily employed to control the amount of adhesive which is applied to the structure. After application of the adhesive, and prior to cooling, the secondary scrim is contacted with the bottom surface, and the resulting structure is passed through nip rolls and cooled. While this type of process is considerably simpler than the latex process, the preparation of carpets of nonuniform quality has, at times, been encountered.

In particular, it was found that carpets could not, with reproducible consistency, be prepared with the combination of high scrim bond and high fuzz resistance. The scrim bond is the force required to peel the secondary backing from the finished carpet and is measured by customary peel test techniques on three-inch wide strips. Fuzz resistance is a measure of how securely the individual fiber filaments are bonded together within a fiber bundle at the primary scrim. If such bonding is deficient, on abrasion of the carpet surface, individual filaments will pull loose from their bundles and collect as fuzz on the carpet surface.

U.S. Pat. 3,551,231, issued on Dec. 29, 1970, in the name of George E. Smedberg discloses a process by which satisfactory carpet can be made using a hot melt technique. The disclosed method principally involves (1) maintaining a calculated critical pressure on the tufted structure while it is in contact with the hot melt adhesive applicator roll, (2) laminating the secondary scrim to the tufted structure substantially immediately after the tufted structure leaves the applicator roll, and (3) supporting the tufted structure containing the secondary scrim for a given time after lamination. While the above Smedberg process represents a substantial improvement over the previous hot melt techniques for preparing finished carpet, the necessity of maintaining a critical pressure during adhesive application was found to detract from process flexibility. Since the appropriate pressure for a given carpet depends on the carpet structure, equipment modifications are required whenever it is desired to change carpet structure. Such modifications are time consuming and detract from the economics of the hot melt process.

SUMMARY OF THE INVENTION

Now, however, there has been discovered an improved process for preparing carpet using a hot melt adhesive backsizing composition. The present process comprises, as an improvement in the general hot melt methods of preparing tufted carpet, the application of a low viscosity precoat adhesive to the backside of the tufted structure prior to the application of the hot melt adhesive backsizing composition. By using the precoat adhesive of the present invention, the necessity of maintaining a critical pressure on the carpet during the hot melt adhesive application can be eliminated; accordingly fuzz resistant, high scrim bond carpet can be prepared under practical and economic conditions.

DESCRIPTION OF THE DRAWING

The drawing schematically depicts an arrangement of apparatus which can be used in accomplishing the present process.

DESCRIPTION OF PREFERRED EMBODIMENTS

The attached drawing generally shows suitable process steps involved in preparing tufted carpet according to the present invention. The bottom surface of a tufted structure 10 is initially contacted with an applicator roll 14 bearing a low viscosity precoat adhesive supplied from a reservoir 12. The bottom surface is then contacted with an applicator roll 16 bearing a hot melt adhesive backsizing composition supplied from the reservoir 18. A pair of hold-down rolls 20 and 22 are positioned above the applicator roll 16 in order to ensure that there is contact between the applicator roll and the bottom surface of the tufted structure 10. The amount of hot melt adhesive deposited on the bottom side of the tufted structure can be controlled by the doctor blade 24. Subsequent to the application of the hot melt adhesive composition, a secondary scrim 26 is placed in contact with the adhesively coated bottom surface of the tufted structure. Preferably, such contact is achieved as soon as possible after the tufted structure leaves the applicator roll, and is conveniently accomplished by means of a pair of pressure nip rolls 28 and 30 which assure intimate contact between the secondary scrim 26 and the bottom side of the tufted structure 10. After passing between the pressure nip rolls 28 and 30, the carpet structure is passed over and in contact with the support 32, preferably until the adhesive composition has cooled below its hot tack temperature. Thereafter, the structure is passed through a second set of pressure nip rolls 34 and 36 and then to a conventional tenter frame and cooler.

The drawing merely depicts a preferred manner in which carpet can be prepared by the presently improved process and, so long as a low viscosity precoat adhesive is applied to the carpet backside prior to the hot melt adhesive application, many modifications hereof are operable. For example, means other than the illustrated hold-down rolls 20 and 22 can be used to ensure contact between the application roll 16 and the bottom surface of the tufted structure 10; such contact only being necessary in order to transfer the desired quantity of adhesive from the roll to the carpet. Similarly, both the hot melt adhesive and the precoat adhesive can be applied by means other than applicator rolls so long as sufficient amounts of these ingredients are deposited onto the carpet backside in the proper sequence. Moreover, in those instances where the presence of a secondary scrim is not required, the tufted structure can be tentered and cooled immediately after the hot melt adhesive backsizing composition is applied.

The method of preparing tufted structures useful herein is not particularly limited. The art of preparing tufted structures is well known and, by such methods, tufted structures are usually prepared with a range of tuft densities (stitches per inch) and pile heights. For a detailed description of methods and materials useful in making tufted carpets, reference is made to U.S. Pat. 3,390,035, issued to Seymour Sands on June 25, 1968, and U.S. Pat. 3,075,865, issued to D. C. Cochran on Jan. 29, 1963. While the present process can be used with tufted structures made from all yarn types, it is particularly suitable for carpet made from monofilament yarn. Also preferred for use herein are tufted structures with pile heights of $12/32$–$21/32$ inch, tuft densities of at least 7.0 stitches per inch, and yarn weights of 14–24 oz./yd.$^2$.

An essential feature of the present invention is the application of a low viscosity precoat adhesive to the backside of the tufted structure prior to the application of the hot melt adhesive backsizing composition. To be effective, the precoat adhesive must readily penetrate the fiber bundles on the backside of the primary scrim. Since, for economically attractive processing speeds, the time available, i.e., the time the carpet is in contact with the precoat applicator roll, for adhesive precoat penetration into the fiber bundle is short, e.g., only several seconds, the precoat adhesive must be applied at a low viscosity. Application of viscosities (Brookfield RVT #3 spindle at 10–100 r.p.m.) on the order of 2–2000 cps. are suitable, while viscosities of 50–500 are preferred. For precoat adhesives applied as hot melts, viscosity can conveniently be controlled by adjusting the application temperature. Of course, high temperatures which deleteriously affect the carpet yarn or scrim material should be avoided. Likewise, low temperatures should be avoided in order to allow the precoat adhesive to penetrate the fiber bundles before solidification. The application viscosities of precoat adhesives other than hot melts can be adjusted to appropriate values by varying the amount of adhesive carrier, i.e., solvent or diluent.

The importance of the application viscosity of the precoat blend is illustrated by the data in Table 1. The viscosity of a standard precoat blend was adjusted by the use of varying amounts of ethylene/vinyl acetate copolymer therein. The more ethylene/vinyl acetate copolymer was used, the higher the viscosity obtained. First the precoat blends were applied to the carpet backside. Afterwards the hot melt adhesive backsizing composition was applied and the fuzz and pill resistance of the finished carpet was determined by the wire brush method as described in Table 4, and by the random tumble pill test. For the purposes of this latter test, "pills" are defined as bunches or balls of tangled fiber ends which are held to the surface of a carpet by one or more fibers. "Cable pills" are entangled fibers which cannot be untangled by passing a pick through the tangled area. Bunches or balls of fibers are not present in cable pills. "Fuzz" is defined as untangled fiber ends projecting from the carpet surface.

The tumble pill tester consists of a Norge home dryer, Model AE-620, modified by: replacing the timer switch with an on-off switch, using a Lucite® door to retain the specimen in the drum, using stainless steel reinforcement for the basket liner and providing for a positive exhaust system.

The tester is loaded with the following materials:

(1) Thirty gum rubber sheets, 18½" x 5¾" x 3/32" of durometer hardness 40±5 weighing approximately 12 lbs.

(2) Five neoprene sheets, Acme #2615, 17¾" x 5¾" x ⅛" of durometer hardness 55±5. The sheets are to be punched with 24 1" diameter holes forming eight rows of there holes each. The total weight of the sheets should be approximately 2.8 lbs.

(3) Six fabric balls, approximately 5" diameter, ½ lb. each, made of cotton rag wrapped with 80 x 80 cotton print cloth and held by masking tape. Print cloth is supplied by Test Fabrics, Inc., 55 Vandam St., New York 13, N.Y., catalog No. 400.

(4) Six maple blocks, 4" x 1½" x 3½".

(5) A minimum of twelve or a maximum of eighteen carpet specimens. The specimens are prepared by cutting three 8" x 8" squares from each carpet sample, selected from the two sides and center of the sample. Two specimens are then stapled back-to-back with a polyethylene stiffener (6¼" x 6¼" x ⅛" 45 mils low density polyethylene sheet, Franklin Fiber-Lamtex Corp., 13th and Governor Printz Blvd., Wilmington, Del.) between them. The carpet specimens are conditioned at 75±2° F. and 50±5% R.H. in moving air for a minimum of 16 hours prior to testing.

The tester is started and the exhaust blower is turned on. At the end of 10 hours of tumbling, the specimens are removed from the tester and the staples holding the specimens to the stiffener are removed. The specimens are vacuumed lightly and the loose edges are trimmed.

The specimens are rated separately for pilling and for fuzzing against the reference standards that the specimens most nearly resemble in color. Carpet pilling standards for cut and loop pile carpets are prepared with the following rating bases:

5—no pilling or fuzzing
4—slight pilling and/or fuzzing
3—moderate pilling and/or fuzzing
2—considerable pilling and/or fuzzing
1—severe pilling or fuzzing.

TABLE 1

| Precoat application viscosity, cps. | Wire brush rating | | Random tumble test | |
|---|---|---|---|---|
| | Appearance rating [1] | Number rating | Pill | Fuzz |
| 1,000 | A | 1.0 | 1.8 | 1.9 |
| 244 | A | 1.0 | 4.8 | 3.1 |
| 235 | A | 1.0 | 4.5 | 3.0 |
| 155 | A | 1.0 | 4.9 | 3.2 |
| 126 | O-N | 4.5 | 5.0 | 3.25 |
| 115 | N | 4.0 | 5.0 | 4.2 |
| 114 | N | 4.0 | 4.95 | 2.3 |
| 110 | N | 4.0 | 4.95 | 3.0 |
| 94 | O | 5.0 | 5.0 | 3.6 |
| 76 | N | 4.0 | 5.0 | 3.1 |
| 56 | N | 4.0 | 4.6 | 1.6 |
| 43 | M | 3.0 | 3.25 | 1.25 |

[1] O=no fuzz (5.0), N=noticeable fuzz (4.0), M=moderate fuzz (3.0), A=appreciable fuzz (1.0).

An operating viscosity of 80–110 cps. results in the best fuzz resistance and, accordingly, this is the most preferred range for the precoat blends of the present invention.

Precoat adhesives useful herein are materials which are solid at room temperature and which can be applied to the carpet backside at the above-indicated low viscosities. To be effective, in bonding together the individual filaments of the fiber bundles at the primary scrim, the adhesive must be capable of wetting the carpet yarn.

Typically useful precoat adhesives include naturally occurring materials such as starch, casein, rosin derivatives and various waxes, as well as synthetic materials such as polymers. Particularly suitable polymeric precoat adhesives include both homopolymers and copolymers (polymers with two or more different copolymerized monomers). Examples of useful polymeric adhesives are polyolefins such as polyethylene, polypropylene, and polybutene; polyvinyls such as polyvinyl chloride and polystyrene; polyesters such as polyvinyl acetate and polyacrylates; partially or completely hydrolyzed polyesters such as polyvinyl alcohols; polyamides; copolymers containing copolymerized olefin, ester, or vinyl monomers and their partially or completely hydrolyzed derivatives such as ethylene/propylene copolymers, ethylene/acrylic acid copolymers, ethylene/vinyl acetate copolymers, ethylene/vinyl acetate/acrylic acid copolymers, ethylene/acrylate or methacrylate copolymers, ethylene/vinyl alcohol copolymers, vinyl acetate/vinyl chloride copolymers, styrene/butadiene copolymers, and alpha-methyl styrene/vinyl toluene copolymers. Particularly preferred precoat adhesives are ethylene/ester copolymers, especially ethylene/vinyl acetate copolymers, containing 15–35 weight percent ester. The molecular weight of the precoat adhesive is not particularly important so long as the above criteria with respect to application viscosity, and solidification at room temperature are satisfied.

Precoat blends containing ethylene/vinyl acetate copolymer and soft waxes produce carpets having good fuzz resistance as measured by the wire brush test but poor fuzz resistance as measured by the random tumble test. This is apparently caused by a break-down of the soft wax possibly by the heat generated during the 10 hours the samples are tumbled. Hard waxes in conjunction with ethylene/vinyl acetate copolymer produced carpets having good fuzz resistance as measured by both the wire brush and the random tumble test, however, the blend tends to migrate under heat causing staining of the secondary jute and reduction of the scrim bond. Most preferred precoat blends contain ethylene/vinyl acetate copolymer, wax, and a resin mixture comprising polyethylene, a microcrystalline wax having a melting point in excess of about 160° F., an alkyl-aromatic thermoplastic hydrocarbon resin with a ring and ball softening temperature of about 77° F. and an unsaturated aliphatic thermoplastic hydrocarbon resin derived from petroleum and having ring and ball softening temperatures of about 212° F. and about 230° F., respectively. These pre-coat blends produce carpets having good fuzz resistance as measured by either the wire brush or random tumble test without any detectable bleed through under heat aging.

The alkyl-aromatic thermoplastic hydrocarbon resin referred to above is a low molecular weight dicyclopentadiene alkylation polymer having ring and ball softening points of about 40° F. to 105° F. Dicyclopentadiene alkylation polymers are described in U.S. Pat. 3,023,200 issued Feb. 27, 1962 to Epstein and Gangemi. As therein defined, the term "alkylation" refers to the formation of a carbon-to-carbon bond between an aromatic nucleus and a dicyclopentadiene nucleus. Also, this patent describes how dicyclopentadiene alkylation polymers can be prepared with desired softening points and molecular weight. Particularly useful resins have softening points of about 65° F.–90° F.

The aliphatic thermoplastic petroleum hydrocarbon resin referred to above is such as described in Canadian Pat. 531,202 issued Oct. 2, 1956 to Ward. As therein set forth, these resins are prepared from reactive olefins and diene monomers having low carbon atom content (5 to 7 carbon atoms), and are substantially free of polymerized aromatics. Of the resins therein described, those having ring and ball softening points (ASTM D–36–26) of about 155° F. to 240° F., and especially above 215° F., are preferred. Such useful resins are available under Pennsylvania Industrial Chemical Corporation's "Piccopale."

As indicated previously, the precoat adhesive can be applied to the carpet backside in a variety of ways. If the adhesive is water soluble, application as an aqueous solution may be the most convenient. Where the adhesive is prepared as an aqueous dispersion, e.g., ethylene/vinyl acetate copolymers containing less than about 40 weight percent ethylene, application as such may be desirable. Most frequently, however, the precoat adhesive is applied to the carpet backside as a hot melt, particularly where the adhesive is soluble in a suitable carrier at a sufficiently low temperature. A hot melt method is most suitable for applying the preferred ethylene/ester precoat adhesives. Except for very low molecular weight ethylene/ester copolymers, i.e., those having melt indexes (ASTM D–1238–57T) in excess of 1000, the copolymers are preferably dissolved in a suitable carrier such as wax, a low molecular weight resin, solvent, etc. at an elevated temperature and the resulting solution (containing about 2–25 weight percent copolymer) is applied as the hot melt.

After application of the precoat adhesive, the hot melt adhesive backsizing composition can be directly applied to the tufted structure without any intermediate drying or cooling of the precoat. However, if desired, the precoat adhesive can be dried or cooled prior to the application of the hot melt backsizing composition.

The precoat adhesive, i.e., just the adhesive, not adhesive plus carrier, must be applied in an amount sufficient to bond together the fibers within the fiber bundles. While the necessary amount of precoat adhesive is dependent on the carpet yarn density and the effectiveness of the adhesive itself, amounts in excess of about 1.5 oz./yd.$^2$ of carpet are not usually required. Ordinarily, the precoat adhesive is employed in an amount of at least 0.2 oz./yd.$^2$ and preferably 0.5–1 oz./yd.$^2$. Of course, when the precoat adhesive is applied in a carrier which does not volatilize on the application of the hot melt adhesive backsizing composition, e.g., dissolved in wax, the actual weight of precoat composition applied to the carpet backside is considerably more than the above amounts.

A variety of hot melt adhesives are useful as the backsizing composition in the present process. While such adhesives can consist solely of a polymeric binder resin, such as an ethylene/vinyl acetate copolymer, for economic reasons they generally include substantial quantities of other ingredients. Thus, in addition to a polymeric binder resin, useful adhesive compositions generally contain at least one of the following ingredients: waxes, fillers, and resin extenders. Also, in addition to or in place of ethylene/vinyl acetate resins other types of binder resins such as polyethylenes and ethylene/acrylate or methacrylate copolymers can be used.

Reference is made to the above-mentioned Sands patent as well as U.S. patent application Ser. No. 789,605, filed on Jan. 7, 1969, in the name of Roland E. Stahl for a description of many useful adhesive compositions. Particularly preferred compositions are described in the Stahl application as having a softening point of at least 190° F. and comprising (A) about 10–35 weight percent ethylene copolymer having a melt index of about 1.2–35 and comprising about 60–85 weight percent copolymerized ethylene and about 15–40 weight percent copolymerized lower vinyl ester, lower acrylate, or lower methacrylate, (B) about 10–25 weight percent high melting point wax, and (C) about 50–70 weight percent resin blend of (a) an aliphatic thermoplastic hydrocarbon resin substantially free of polymerized aromatics prepared from low carbon atom diene and olefin monomers and having a softening point of about 155° F.–240° F. and (b) a dicyclopentadiene alkylation polymer resin having a sofening point of about 40° F.–105° F.; the weight percentages of (A), (B), and (C) being based on the combined weight of these three ingredients and the weight ratio of (a) to (b) being about 0.3–4. Furthermore, these compositions usually contain up to about 45 weight percent filler, based on the total composition.

At application temperatures of 250° F.–330° F., the Brookfield viscosity of the backsizing composition is usually about 50,000–5,000, a viscosity which is considerably higher than that of the precoat adhesive. The backsizing composition must be applied in an amount sufficient to impart the desired "hand" to the finished carpet and, when present, bond the secondary scrim to the tufted structure. The use of at least 5 oz./yd.² of the hot melt adhesive backsizing composition (as distinguished from the precoat adhesive) will ordinarily provide satisfactory scrim bond. However, good carpet "hand" is ordinarily achieved by using at least 12 oz./yd.² of total non-fugitive material applied to the carpet backside (precoat plus carrier plus backsize composition). Table 2 gives representative coating weights of the precoat and backsize in finished carpets containing a secondary scrim for carpets prepared from hot melt (ethylene/ester copolymers dissolved in wax) and aqueous latex precoat adhesive compositions.

TABLE 2

|  | Precoat | Hot melt backsize |
| --- | --- | --- |
| From hot melt precoat | 1–15 oz./yd.² | 5–15 oz./yd.². |
| From aqueous latex precoat | 0.2–2 oz./yd.² | 5–30 oz./yd.². |

The amount of precoat and backsize can be varied within the above ranges in order to achieve the desired carpet "hand."

In order to prepare finished carpet with exceptionally good secondary scrim bonds, the lamination of the secondary scrim to the backside of the tufted structure should occur substantially immediately after the application of the hot melt adhesive backsizing composition. For highest scrim bonds, the secondary scrim is laminated to the carpet structure at about as geometrically close to the point at which the structure leaves the applicator or hold-down roll as possible.

After scrim lamination, the carpet structure should be supported until the backsizing adhesive composition has cooled below its hot tack temperature. This step ensures that the adhesive adequately wets the secondary scrim while being supported. Failure to do this results in carpets with inferior secondary scrim bonds. While, in most instances, sufficient wetting is achieved by the time the adhesive has cooled to its hot tack temperature, if it is found that such has not occurred, the structure can be heated by independent means before or while in contact with the support. Similarly, cooling means can also be employed if adequate wetting is rapidly achieved after lamination. A convenient support is a table upon which the carpet can be passed over. Hot tack temperatures for most adhesives useful in the present invention are about 160° F.–210° F. and are indicated by the softening points of the adhesive determined by customary techniques.

The examples presented in Table 4 illustrate the present invention. All parts and percentages are by weight unless otherwise specified. The carpets illustrated in the examples were prepared using apparatus similar to that shown in the drawing with the following specifications:

Applicator roll 14=8" diameter-22" face, steam heated, driven at 26 f.p.m.
Applicator roll 16=8" diameter-22" face, steam heated, driven at 15 f.p.m.
Hold-down rolls 20 and 22=8" diameter-22" face, water cooled, idler (spaced 0.4–0.6" from applicator roll)
Pressure roll 30=2" diameter-22" face, water cooled, idler
Pressure roll 28=4" diameter-22" face, steam heated, idler
Support 32=3' long-22" wide table
Pressure rolls 34 and 36=6" long-22" face idler rolls
At closest point, surface separation between rolls 22 and 28=1.5 inches.

The following composition was used as the hot melt adhesive backsizing composition. Where jute was the primary scrim, the application temperature was about 300° F. Where spunbonded polypropylene was the primary scrim, an application temperature of about 250° F. was used.

|  | Parts |
| --- | --- |
| Ethylene/vinyl acetate copolymer (25 wt. percent VAc–2 Melt Index) | 15 |
| Microcrystalline wax (M.P.=180° F.) | 10 |
| Polyethylene wax (M.W.=3500, M.P.=240° F.) | 2 |
| Dicyclopentadiene alkylation polymer, softening point 71° F.–83° F., specific gravity 0.97 | 17 |
| Aliphatic thermoplastic petroleum based hydrocarbon resin, softening point 71° F.–83° F., specific gravity 0.97 | 26 |
| Calcium carbonate filler | 30 |

The precoat adhesive compositions listed in Table 3, applied at the indicated temperatures with the specified viscosities, were used in the examples in Table 4:

TABLE 3

| | | Viscosity at application temperature of— | |
| --- | --- | --- | --- |
| | Precoat adhesive composition | 75° F. | 250° F. |
| A | 95% paraffin wax (M.P. 154° F.), 5% ethylene/vinyl acetate copolymer (25% VAc, M.I.=2). | | 20 |
| B | 90% paraffin wax (M.P. 154° F.), 10% ethylene/vinyl acetate copolymer (25% VAc, M.I.=2). | | 93 |
| C | 85% paraffin wax (M.P. 154° F.), 15% ethylene/vinyl acetate copolymer (25% VAc, M.I.=2). | | 320 |
| D | 5% aqueous solution of polyvinyl alcohol. | 30 | |
| E | 55% solids aqueous dispersion of polyvinyl acetate. | 90 | |
| F | 50% solids aqueous dispersion of vinyl acetate/ethylene copolymer (85 wt. percent VAc). | 2,000 | |

TABLE 4

| Example | Yarn | Tufted structure Primary scrim b | Stiches/ inch c | Pile height, inches | Yarn weight, oz./yd.² | Precoat composition a Type | Amount, oz./yd.² | Amount of backsizing composition, oz./yd.² | Fuzz rating d | Scrim bond, lb./3 in. |
|---|---|---|---|---|---|---|---|---|---|---|
| I | Nylon | J | 8.5 | 18/32 | 20 | A | 4.1 | 19.8 | N-M | 16.8 |
| II | do | J | 8.5 | 18/32 | 20 | None | | 22.3 | A | 13.0 |
| III | do | J | 8.5 | 18/32 | 20 | B | 6.0 | 17.0 | N-M | 15.8 |
| IV | do | J | 8.4 | 18/32 | 20 | None | | 23.6 | A | 27.0 |
| V | do | J | 8.4 | 18/32 | 20 | B | 7.9 | 12.2 | O-N | 10.9 |
| VI | do | J | 8.4 | 18/32 | 20 | B | 6.0 | 15.1 | O-N | 16.7 |
| VII | do | J | 8.4 | 18/32 | 20 | B | 5.4 | 10.6 | M | 13.6 |
| VIII | do | P | 8.4 | 18/32 | 20 | B | 8.0 | 13.4 | O-N | 16.7 |
| IX | do | P | 8.4 | 18/32 | 20 | B | 7.1 | 13.3 | M-N | 18.4 |
| X | do | P | 8.4 | 18/32 | 20 | B | 8.4 | 15.2 | O-N | 22.1 |
| XI | Polypropylene | J | 7.5 | 5/8 | 30 | B | 6.7 | 17.2 | M | 20.2 |
| XII | Nylon | J | 8.5 | 18/32 | 20 | C | 13.4 | 15.9 | O | 14.0 |
| XIII | do | J | 8.5 | 18/32 | 20 | D | 0.8 | 21.0 | N-M | 10.0 |
| XIV | do | J | 8.5 | 18/32 | 20 | E | 0.3 | 22.8 | O-N | 15.5 |
| XV | do | J | 8.5 | 18/32 | 20 | F | 0.6 | 17.0 | O-N | 16.0 | a For D, E, and F weight is of just adhesive, not adhesive plus aqueous carrier.
b J=jute scrim having a weight of 8 oz./yd.²; P=spunbonded polypropylene scrim having a weight of 3.5 oz./yd.². Secondary scrim was jute in all examples.
c Tufting needle gage=5/32 inch.
d Measured by 20 strokes of a wire brush and subjectively compared for fuzz with following ratings: O=no fuzz; N=noticeable fuzz; M=moderate fuzz; A=appreciable fuzz. Fuzz rating of O, N, or M is acceptable.

What is claimed is:

1. In the process for preparing a carpet comprising forming a tufted structure of a primary backing material stitched with closely spaced tufts of yarn and applying to the backside of the tufted structure a hot melt adhesive backsizing composition; the improvement comprising, applying to the backside of the tufted structure, at a time prior to the application of the hot melt adhesive backsizing composition, at least 0.2 oz./yd.² of a precoat adhesive having an application viscosity of 2-2000 cps., the precoat adhesive being a solid at room temperature and being capable of wetting the carpet yarn, and subsequently treating the tufted structure with a hot melt adhesive backsizing composition having an application viscosity higher than that of the precoat adhesive.

2. The process of claim 1 wherein the hot melt adhesive backsizing composition has an application viscosity of 5,000-50,000 cps.

3. The process of claim 2 wherein the precoat adhesive has an application viscosity of 50-500 cps.

4. The process of claim 3 wherein the precoat adhesive has an application viscosity of about 80-110 cps.

5. The process of claim 4 wherein the precoat adhesive is applied in an amount of 0.5-1 oz./yd.².

6. The process of claim 1 wherein the precoat adhesive is applied as a hot melt.

7. The process of claim 6 wherein the precoat adehsive is an ethylene/ester copolymer.

8. The process of claim 7 wherein the precoat adhesive is an ethylene/vinyl acetate copolymer and wherein the copolymer is applied as a solution in wax, the copolymer being present in an amount of 2-25 weight percent.

9. The process of claim 8 wherein the hot melt adhesive backsizing composition has an application viscosity of 5,000-50,000 cps.

10. The process of claim 9 wherein the precoat adhesive has an application viscosity of 50-500 cps.

11. The process of claim 7 wherein the precoat adhesive is an ethylene/vinyl acetate copolymer and wherein the copolymer is applied as a solution in wax and a mixture comprising polyethylene, a microcrystalline wax having a melting point in excess of about 160° F., a dicyclopentadiene alkylation polymer resin having a ring and ball softening point of about 77° F. and an aliphatic thermoplastic hydrocarbon resin substantially free of polymerized aromatics prepared from low carbon atom diene and olefin monomers and having a ring and ball softening point of about 212° F. and about 230° F., respectively.

12. The process of claim 11 wherein the precoat adhesive has an application viscosity of about 80-110 cps.

13. The process of claim 12 wherein the precoat adhesive is applied in an amount of 0.5-1 oz./yd.².

14. The process of claim 1 wherein the precoat adhesive is applied as an aqueous latex.

15. The process of claim 14 wherein the precoat adhesive is applied in an amount of 0.2-2 oz./yd.².

16. The process of claim 1 wherein only a primary scrim is used and the tufted structure is cooled immediately after the hot melt adhesive backsizing composition is applied.

References Cited
UNITED STATES PATENTS

| 3,238,595 | 3/1966 | Schwartz et al. | 156—72 UX |
| 3,266,969 | 8/1966 | Makansi | 156—72 X |
| 3,285,798 | 11/1966 | Tesoro | 156—72 X |
| 3,321,427 | 5/1967 | Tyran | 260—888 X |
| 3,394,043 | 7/1968 | Parlin et al. | 156—72 X |
| 3,424,632 | 1/1969 | Adler | 156—72 |
| 3,533,893 | 10/1970 | Hartstein | 156—72 X |
| 3,542,613 | 11/1970 | Fox et al. | 156—72 |
| 3,544,660 | 12/1970 | Thomas et al. | 260—878 R |
| 3,575,778 | 4/1971 | Wilcox | 156—72 X |

CARL D. QUARFORTH, Primary Examiner

P. A. NELSON, Assistant Examiner

U.S. Cl. X.R.

156—72, 315, 333, 334